March 18, 1930.  G. H. VOLLE  1,750,736
ELECTRICAL WINDOW LIFT FOR AUTOMOBILES
Filed April 6, 1927   2 Sheets-Sheet 1
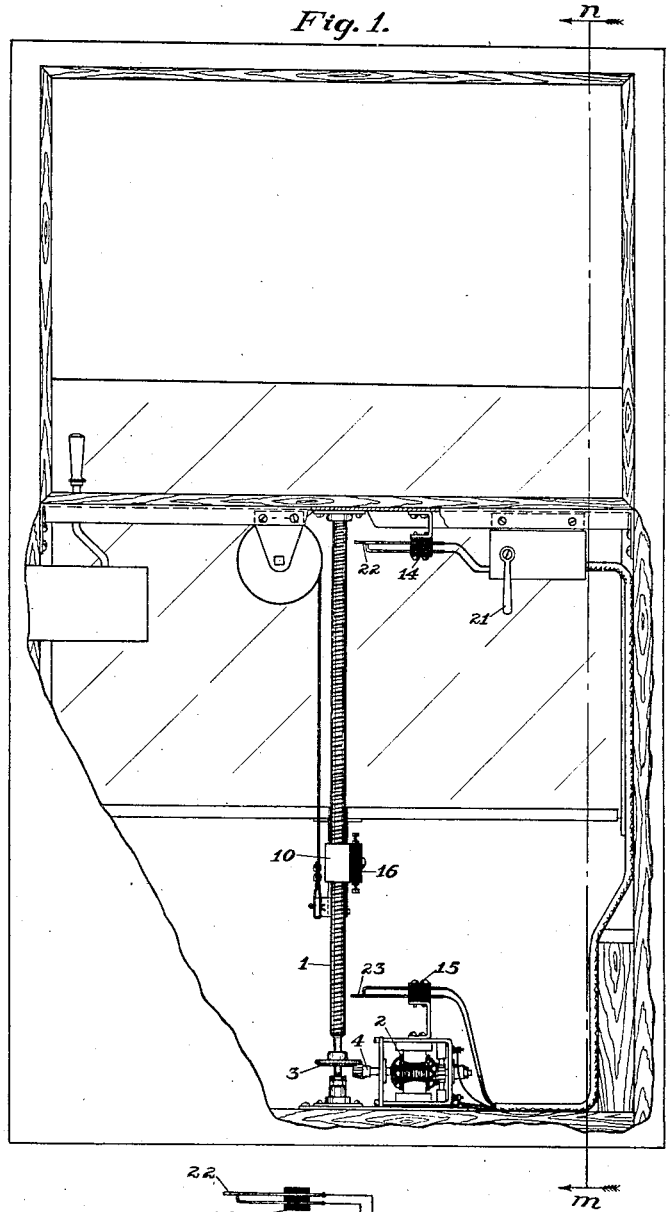
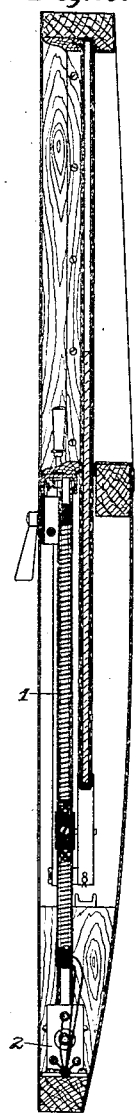
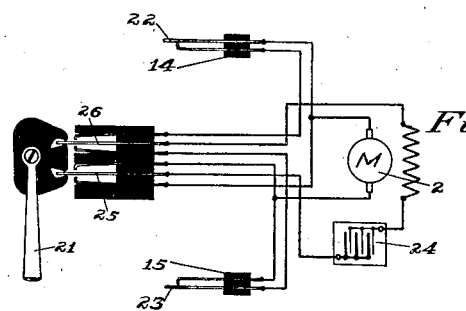
George H. Volle
INVENTOR.
BY: A. B. McCall.
ATTORNEYS.

March 18, 1930.  G. H. VOLLE  1,750,736
ELECTRICAL WINDOW LIFT FOR AUTOMOBILES
Filed April 6, 1927   2 Sheets-Sheet 2
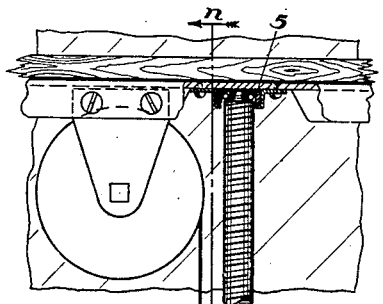
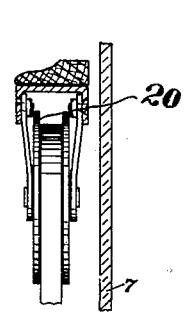
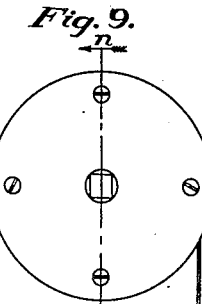
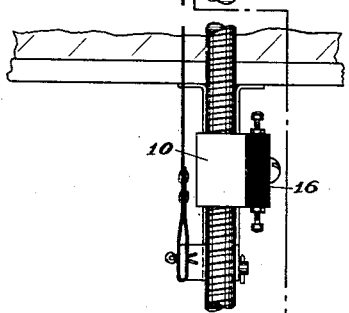
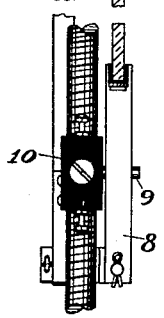
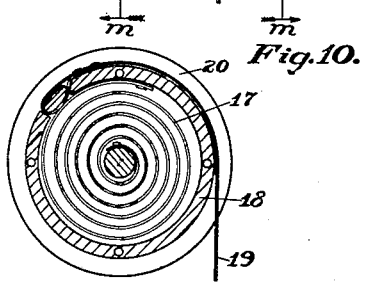
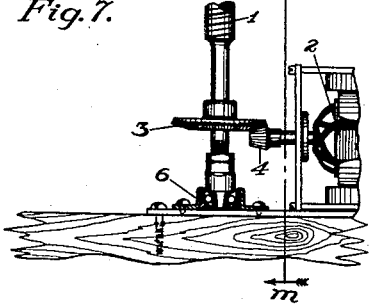
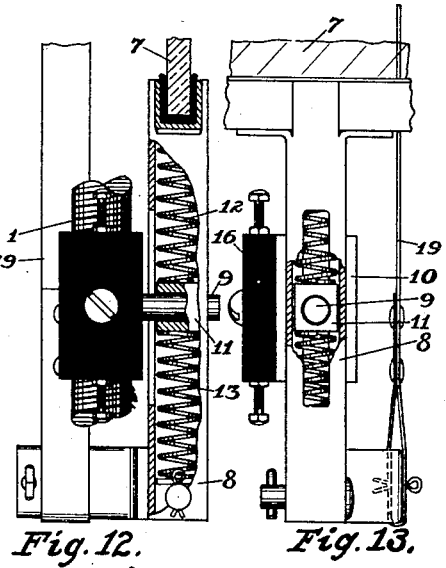
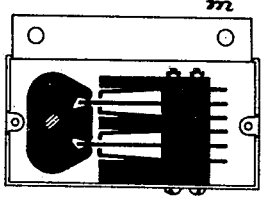
George H. Volle
INVENTOR.
BY
A. B. McCall.
ATTORNEYS.

Patented Mar. 18, 1930

1,750,736

UNITED STATES PATENT OFFICE

GEORGE H. VOLLE, OF SPRINGFIELD, ILLINOIS

ELECTRICAL WINDOW LIFT FOR AUTOMOBILES

Application filed April 6, 1927. Serial No. 181,386.

My invention relates to devices adapted to provide automatic means of raising and lowering an automobile window, an object being in this device to provide an electrically operative mechanism for controlling the movements of the window and requiring on the part of the operator only the throwing of a switch to accomplish the desired movement of the window up or down.

A further object of my invention is to provide in an electrically operated window lift for automobiles a suitable combination of motor driven means for moving the window with simple, compact, and practical means for balancing the weight of the window at all times.

A further object of my invention is to provide an electrical window lift for automobiles actuated by motor driven from current coming from an automobile battery.

I attain the objects of my invention in the device described in the annexed specifications recited in the claims and illustrated in the accompanying drawings in which like reference numerals indicate like parts in the several figures.

Referring to the figures:

Fig. 1 is an elevation of a car door showing in a cut away the assembly of my window lift device.

Fig. 2 is a vertical cross section of an automobile door exposing to view the window lift of my invention showing its connection with the window glass.

Fig. 3 is a circuit diagram of electrical circuit adapted to control my window lift, showing in connection therewith a preferred type of switch for controlling the same.

Fig. 4 is a sectional detail of the preferred type of switch adapted to control the electric circuit.

Fig. 5 is a side elevation of the switch shown in Fig. 4.

Fig. 6 is a vertical cross section on lines M—N of Fig. 5 of the same switch.

Fig. 7 is an enlarged detail of the operating mechanism of the window lift of my invention shown in side elevation.

Fig. 8 is a detail in elevation end view taken on lines M—N on Fig. 7.

Fig. 9 is a side elevation of the spring casing used for balancing the window weight when my window lift is in normal operation.

Fig. 10 is a section of my spring casing on lines M—N Fig. 9.

Fig. 11 is a cross section on lines M—N Fig. 10 of my spring casing.

Figure 12 is a detail showing in a cut-away the resilient attachment of the window lift sleeve —10— with the window to be lifted through pin —9—.

Figure 13 is a side view of a detail portion of the lifting connections shown in Figure 12.

When driving an automobile very frequently a situation arises making it advisable for the driver to raise or lower the window and to do this while the car is in motion is usually a risky thing to do, at least; and many times a dangerous thing to do with the present practice of taking one hand off the steering wheel and turning a crank to raise or lower the window.

My idea therefore of introducing my invention is to provide an electrically controlled window lift whereby the operator may control the same merely by shifting a switch lever suitably located.

Referring in detail to the device of my invention I provide a lifting screw —1— controllably connected to a motor —2—, through bevel gears —3— and —4— and mounted at the upper and lower ends —5— and —6— respectively in ball bearings so as to be comparatively easy to turn when raising or lowering the window glass —7— attached thereto through a sleeve —8— and a resiliently mounted lift pin —9— attached to sleeve —10— adapted to be raised and lowered as it rides the threads of lifting screw —1—.

Sleeve —8— has provided therein a resilient mounted bearing for pin —9— comprising a mounting lug —11— resiliently supported above and below by springs —12— and —13— so as to absorb to a measurable extent the shock normally incident to the movement of a window in striking the upper or lower limits in the frame especially if the window has been moving speedily.

Referring to Fig. 1, and Fig. 3, I provide a pair of limit switches —14— and —15— respectively with which lug —16— is adapted to make contact for breaking the electric circuit which controls the motor —2— thus stopping the rotation of the lifting screw —1— and consequently stopping the rising or lowering motion of the window —7— controlled thereby.

In order to suitably balance the weight of the window in the effort to make the window more easily controllable I provide a spring —17— mounted within a casing —18— and having attached thereto a window lift strap —19—. This strap is adapted to be rolled up on the outer surface of spring drum —18— as the window is being lifted and prevented from slipping off of this drum by a flange —20— on the drum.

It will therefore be seen that when switch —21— is in neutral position (see Fig. 3) the circuit is broken and when swinging the switch to the right the motor —2— (see Fig. 1) rotates lifting screw —1— so as to raise the window and the window continues to rise until lug —16— strikes point —22— of switch —14—. When switch —21— is reversed the window moves down with sleeve —10— carried by the thread of screw —1— until switch point —23— of switch —15— is touched by lug —16— thus breaking the circuit and stopping the motor. In the meantime the window may be stopped any place between its upper and lower limits merely by throwing switch —21— into neutral position.

Referring to Fig. 3, the battery —24— is the source of power and by a study of this circuit diagram and the manner in which switch —21— controls contact members —25— and —26— it will be clearly understood how the control circuit for my window lift mechanism is operated.

To those skilled in the art pertaining to electrical appliances it will be evident that certain details of construction in my device may be changed without departing from the spirit and scope of my invention but the preferred arrangement is herein above described and illustrated in the drawings.

Having thus described the nature of my invention what I claim is:

1. In an automobile window lift of the character described the combination with an upright adjustment screw, a reversible motor adapted to operatively rotate the same through gears and a pair of oppositely disposed limit switches, of a balancing spring for balancing the weight of the window, a threaded sleeve and an integral lift pin adjustably supported on said upright screw, a slotted sleeve spring casing controllably secured to the adjustable window; said integral lift pin of said adjustable sleeve controllably and resiliently engaging said adjustable window through said slotted sleeve by a bearing resiliently mounted within this sleeve; and switch means for the optional control of said electric source of energy, whereby said window may be suitably balanced and controlled in its movements at the will of the operator through the motor actuated control of the lifting screw.

2. An electric window lift for automobiles including a rotatable screw lifting member, a motor geared thereto for the controllable rotation thereof in either direction, means for connecting the automobile window to said lifting screw, limit switches for controlling the motor and consequent top and bottom limits of movement of the window when in normal operation, spring cushion means for minimizing shock to the window when the lifting force is applied and a casing mounted balancing spring having an integral winding drum for the accommodation of a window balancing strap; whereby said window may be suitably balanced, and raised and lowered at the will of the operator through the motor actuated control of the lifting screw.

3. In an automobile electrical window lift of the character described having electrical actuating means for moving the glass up and down in one continuous movement in either direction the combination with a continuous upright lifting screw bar rotatably mounted and supportably and operatively carrying the window glass, of an electric motor operatively and reversibly controlling the rotation of the screw, and a coil spring operatively mounted within a disc casing therefor forming an integral winding drum on the outer and flanged surface of said spring counterbalance provided with an inner actuating spring and carrying on the outer surface a lifting strap operatively engaging a bracket secured to said window glass and a pair of compression springs resiliently and supportably connecting said window glass with said upright continuous lifting screw, switch means for optionally controlling the motor and means for resiliently stopping the window at its upper and lower limits.

In witness whereof, I hereunto set my hand this 16th day of February, 1927.

GEORGE H. VOLLE.